(12) United States Patent
Kobayashi

(10) Patent No.: US 11,704,779 B2
(45) Date of Patent: Jul. 18, 2023

(54) HEAD-UP DISPLAY DEVICE

(71) Applicant: JVCKENWOOD Corporation, Yokohama (JP)

(72) Inventor: Tatsuru Kobayashi, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 62 days.

(21) Appl. No.: 17/453,364

(22) Filed: Nov. 3, 2021

(65) Prior Publication Data

US 2022/0058780 A1 Feb. 24, 2022

Related U.S. Application Data

(63) Continuation of application No. PCT/JP2020/020227, filed on May 22, 2020.

(30) Foreign Application Priority Data

Jun. 26, 2019 (JP) .................................. 2019-118435
Jun. 26, 2019 (JP) .................................. 2019-118436

(51) Int. Cl.
*G09G 5/00* (2006.01)
*G06T 5/00* (2006.01)
(Continued)

(52) U.S. Cl.
CPC ................ *G06T 5/006* (2013.01); *G02B 5/10* (2013.01); *G02B 27/0101* (2013.01); (Continued)

(58) Field of Classification Search
CPC ...... G06T 5/006; G02B 5/10; G02B 27/0101; G02B 2027/014; G02B 2027/0134; (Continued)

(56) References Cited

U.S. PATENT DOCUMENTS

2009/0128901 A1* 5/2009 Tilleman ................ G02B 30/34
353/122
2016/0209649 A1* 7/2016 Shigeno ............ G02F 1/133605
(Continued)

FOREIGN PATENT DOCUMENTS

| CN | 105404011 A | 3/2016 |
| JP | 2011-64760 A1 | 3/2011 |
| JP | 2014-010418 A | 1/2014 |

OTHER PUBLICATIONS

Extended European Search Report from European Application No. 20833053.0 dated Jun. 24, 2022, 9 pages.
(Continued)

*Primary Examiner* — Thuy N Pardo
(74) *Attorney, Agent, or Firm* — Shih IP Law Group, PLLC

(57) ABSTRACT

A head-up display device includes: a display unit that produces a display light for the left eye by modulating a first illumination light derived from superimposing first illumination light beams output from a first region of a fly eye lens and produces a display light for the right eye by modulating a second illumination light derived from superimposing second illumination light beams output a second region of the fly eye lens; and an image processing unit that produces an image for the left eye and produces an image for the right eye; and a display control unit that causes a display unit to display the image for the left eye when the first illumination light is produced and causes the display unit to display the image for the right eye when the second illumination light is produced.

7 Claims, 14 Drawing Sheets

(51) Int. Cl.
*G02B 5/10* (2006.01)
*G02B 27/01* (2006.01)
*G09G 3/00* (2006.01)
*G09G 5/10* (2006.01)
*B60K 35/00* (2006.01)

(52) U.S. Cl.
CPC .............. *G09G 3/002* (2013.01); *G09G 5/10* (2013.01); *B60K 35/00* (2013.01); *B60K 2370/1529* (2019.05); *B60K 2370/25* (2019.05); *B60K 2370/334* (2019.05); *G02B 2027/014* (2013.01); *G09G 2380/10* (2013.01)

(58) Field of Classification Search
CPC .......... G02B 30/27; G09G 3/002; G09G 5/10; G09G 2380/10; B60K 35/00; B60K 2370/1529; B60K 2370/25; B60K 2370/334; B60K 2370/1531; H04N 13/307; H04N 13/327

USPC .................................................... 345/7, 8, 9
See application file for complete search history.

(56) References Cited

U.S. PATENT DOCUMENTS

| | | | |
|---|---|---|---|
| 2016/0243942 A1* | 8/2016 | Sato | G02F 1/133608 |
| 2017/0299922 A1* | 10/2017 | Matsuura | B60K 35/00 |
| 2019/0129171 A1* | 5/2019 | Narushima | G02B 27/0101 |
| 2019/0298056 A1* | 10/2019 | Krämer | B32B 15/10 |

OTHER PUBLICATIONS

International Search Report for the corresponding PCT Application No. PCT/JP2020/020227 with English translation dated Aug. 4, 2020, 5 pages.

* cited by examiner

FIG. 3A
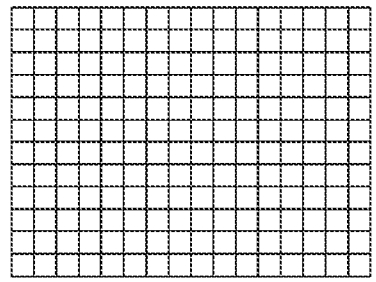
140
FIG. 3B  FIG. 3C  FIG. 3D
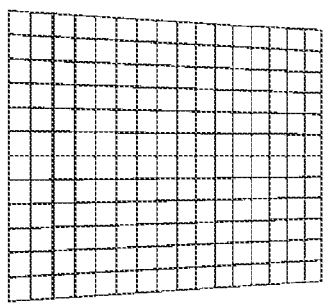 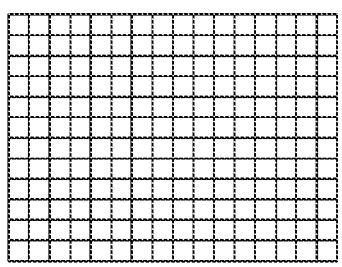 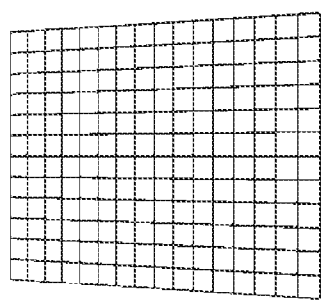
150L  150C  150R
FIG. 3E
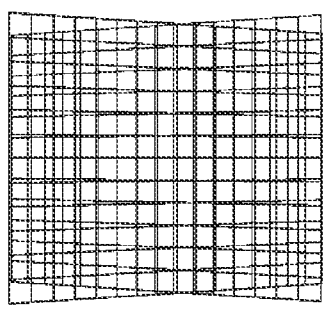
150

HEAD-UP DISPLAY DEVICE

CROSS REFERENCE TO RELATED APPLICATION

Priority is claimed to Japanese Patent Application No. 2019-118435, filed on Jun. 26, 2019, Japanese Patent Application No. 2019-118436, filed on Jun. 26, 2019, the entire contents of which are incorporated herein by reference.

BACKGROUND

1. Field of the Disclosure

The present disclosure relates to head-up display devices.

2. Description of the Related Art

Recently, head-up display devices are available for use as display devices for vehicles. A head-up display device projects an image display light toward, for example, a windshield of a vehicle and displays a virtual image based on the image display light, superimposing the virtual image on the scenery outside the vehicle. A device for presenting a stereoscopic image by producing an image display light for the left eye and an image display light for the right eye separately is also proposed (see, for example, patent literature 1).

SUMMARY

In order to enlarge the display size of a virtual image, it is required to increase the magnification factor of the projection optical system for projecting an image display light. If the magnification factor of the projection optical system is increased, however, the virtual image is distorted even further due to the distortion aberration, etc. produced in the optical system. Distortion aberration that results in images appearing differently left and right makes it difficult to recognize virtual images viewed by the left and right eyes, respectively, as the same image, which could possibly cause visual fatigue.

A head-up display device according to an embodiment includes: an illumination unit that includes a light source, a fly eye lens, and a condenser, the fly eye lens including a first region that splits an output light of the light source into a plurality of first illumination light beams and a second region that splits the output light of the light source into a plurality of second illumination light beams, the condenser producing a first illumination light by superimposing the plurality of first illumination light beams output from the first region of the fly eye lens and producing a second illumination light by superimposing the plurality of second illumination light beams output from the second region of the fly eye lens; a display unit that produces a display light for the left eye by modulating the first illumination light and produces a display light for the right eye by modulating the second illumination light; a concave mirror that projects the display light for the left eye and the display light for the right eye toward a virtual image presentation plate to cause the display light for the left eye reflected by the virtual image presentation plate to travel toward a left region of an eye box and to cause the display light for the right eye to travel toward a right region of the eye box; an image processing unit that produces an image for the left eye by applying a first distortion correction process to an image for display and produces an image for the right eye by applying a second distortion correction process different from the first distortion correction process to the image for display; an illumination control unit that causes the illumination unit to produce the first illumination light and the second illumination light alternately; and a display control unit that causes the display unit to display the image for the left eye when the first illumination light is produced and causes the display unit to display the image for the right eye when the second illumination light is produced.

Optional combinations of the aforementioned constituting elements, and mutual substitution of constituting elements and implementations of the disclosure between methods, apparatuses, and systems may also be practiced as additional modes of the disclosure.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIGS. 3A-3E schematically show an image displayed on the display unit according to a comparative example and virtual images presented based on the image;

A description will be given of embodiments with reference to the drawings. Specific numerical values are shown in the embodiments by way of example only to facilitate the understanding of the embodiments and should not be construed as limiting the scope of the embodiments unless specifically indicated as such. Those elements in the specification and drawings that have substantially identical functions and structures are represented by the same reference symbols, and the description is not duplicated. Elements not directly relevant to the embodiments are omitted from the illustration.

A purpose of the disclosure is to improve the viewability of a virtual image magnified by a high factor.

Figure 1:
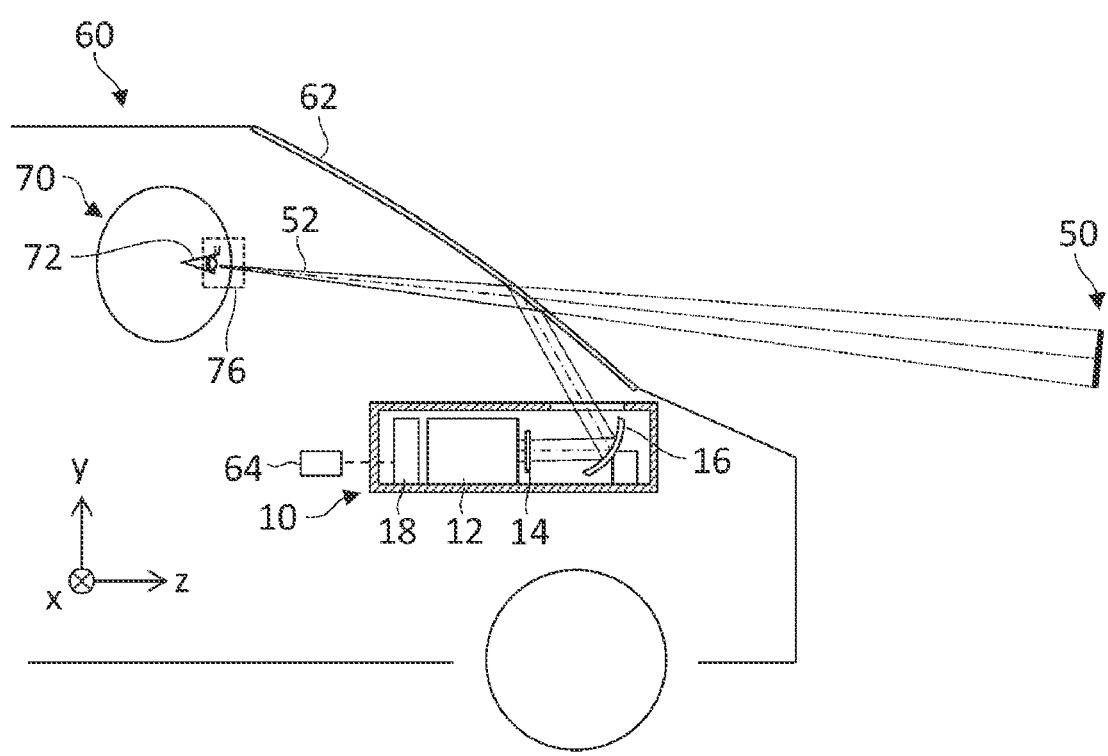
FIG. 1 schematically shows the configuration of a head-up display device according to the embodiment.

FIG. 1 schematically shows the configuration of a head-up display device 10 according to the embodiment. In this embodiment, the head-up display device 10 is installed in a dashboard of a vehicle 60, which exemplifies a moving object. The head-up display device 10 presents a virtual image 50 in front of the vehicle 60 in the direction of travel (rightward direction in FIG. 1) by projecting an image display light 52 onto a windshield 62, which is a virtual image presentation plate. A user 70 (e.g., the driver) can view the virtual image 50 superimposed on the actual scenery via the windshield 62. Therefore, the user 70 can access information shown in the virtual image 50 substantially without moving the line of sight while driving the vehicle. Referring to the FIG. 1, the direction of travel of the vehicle 60 (longitudinal direction) is defined as the z direction, the vertical direction of the vehicle 60 (up-down direction) is defined as the y direction, and the horizontal direction of the vehicle 60 is defined as the x direction.

The virtual image 50 is presented at a distance of, for example, about 2 m-5 m in front of the user 70. The field of view (FOV) corresponding to the display size of the virtual image 50 is, for example, about 5° in the horizontal direction (direction of horizontal line) and about 2° in the vertical direction (perpendicular direction).

The head-up display device 10 includes an illumination unit 12, a display unit 14, a concave mirror 16, and a control device 18. The head-up display device 10 is connected to an external device 64.

The illumination unit 12 produces an illumination light for illuminating the display unit 14. The illumination unit 12 includes a light source such as a light emitting diode (LED) and an optical element for producing an illumination light by adjusting the light intensity distribution and angle distribution of the light output from the light source.

The display unit 14 produces an image display light by modulating the illumination light. The display unit 14 includes a display element such as a liquid crystal panel. Based on an image signal transmitted from the control device 18, the display unit 14 produces the display light 52 of a display content corresponding to the image signal.

The concave mirror 16 reflects the display light 52 produced by the display unit 14 and projects the reflected light toward the windshield 62. The concave mirror 16 projects the display light 52 so that the display light 52 reflected by the windshield 62 travels toward an eye box 76 where eyes 72 of the user 70 are located. This allows the user 70 to view the virtual image 50 based on the display light 52. The concave mirror 16 is configured to magnify the image based on the display light 52 for presentation to the user 70. For example, the concave mirror 16 is configured to magnify the image displayed on the display unit 14 by a factor of 0.6 or higher. The reflecting surface of the concave mirror 16 is comprised of a free-form surface such as an aspheric surface.

The control device 18 controls the operation of the illumination unit 12 and the display unit 14 to generate the image for display and present the virtual image 50 corresponding to the image for display. The control device 18 is connected to the external device 64 and, for example, generates the image for display based on the information from the external device 64.

The external device 64 is a device for generating original data for an image displayed as the virtual image 50. For example, the external device 64 may be an Electronic Control Unit (ECU) for the vehicle 60, a navigation device, or a mobile device such as a cell phone, smartphone, and tablet. The external device 64 transmits, to the control device 18, image data necessary to display the virtual image 50, information indicating the content and type of the image data, and information related to the vehicle 60 such as the speed and current position of the vehicle 60.

Figure 2A:
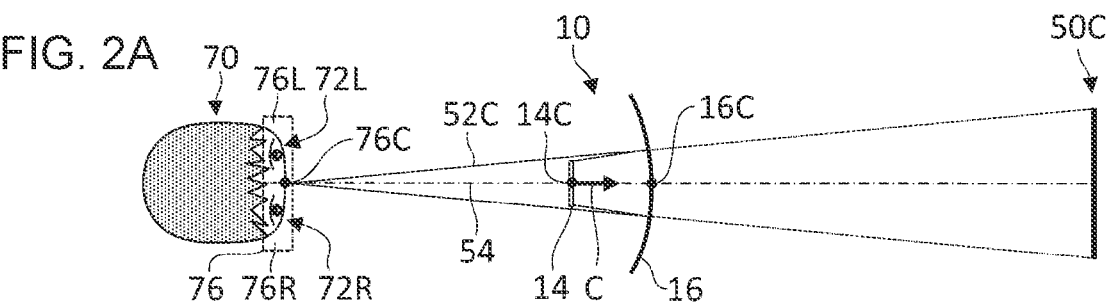
FIGS. 2A-2C schematically show light paths of display light.
Figure 2B:
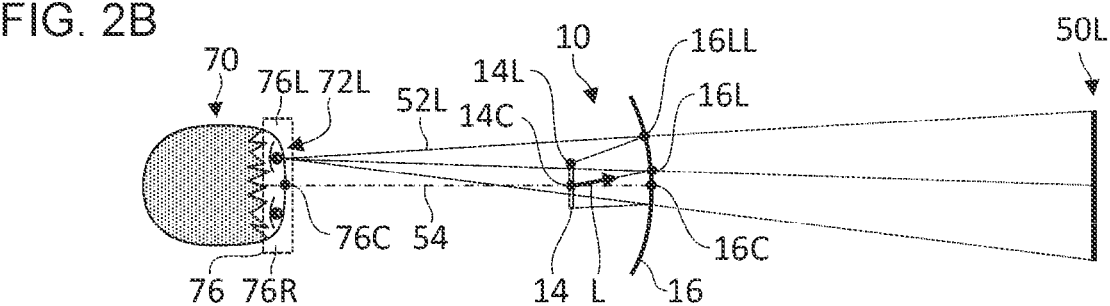
Figure 2C:
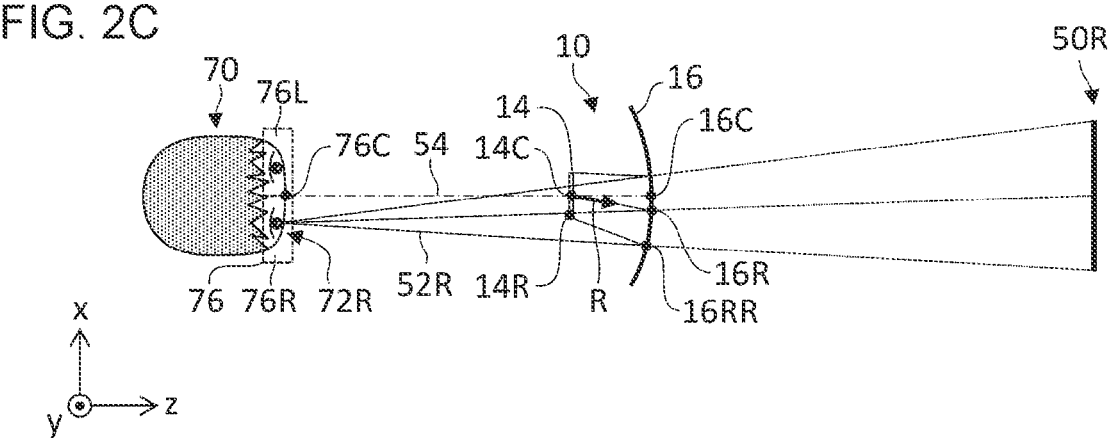

FIGS. 2A-2C schematically show light paths of display light 52C, 52L, 52R. FIGS. 2A-2C show the configuration of the head-up display device 10 as seen from above the vehicle 60. The illumination unit 12 and the windshield 62 are omitted from the illustration for ease of understanding. The display light 52C, 52L, 52R respectively shown in FIGS. 2A-2C each exits the display unit 14, is reflected by the concave mirror 16 and the windshield 62 (not shown), and travels toward the eye box 76.

The eye box 76 is a range in which the virtual image 50 presented by the head-up display device 10 can be viewed. The eye box 76 is set to be elongated in the horizontal direction (x direction) so as to cover a left eye 72L and a right eye 72R of the user 70. The length of the eye box 76 in the horizontal direction is set to be, for example, about twice the interocular distance of the eyes 72L, 72R of the user 70. The interocular distance between the eyes 72L, 72R depends on the individual but is generally about 60 mm-70 mm. The length of the eye box 76 in the horizontal direction is set to be, for example, about 120 mm-130 mm. In an ordinary usage mode shown in FIGS. 2A-2C, the right eye 72R of the user 70 is located in a right region 76R of the eye box 76, and the left eye 72L of the user 70 is located in a left region 76L of the eye box 76.

FIG. 2A schematically shows the light path of the central display light 52C traveling toward a center 76C of the eye box 76. The central display light 52C is, as indicated by an arrow C, a display light output along a light axis 54 of the optical system of the head-up display device 10. The light axis 54 is defined as a path of light exiting a center 14C of the display unit 14 and traveling toward the center 76C of the eye box 76. The concave mirror 16 is configured in a shape symmetrical with respect to the light axis 54 in the horizontal direction (x direction). The central display light 52C is reflected at a center 16C of the concave mirror 16 or the neighborhood thereof. The central display light 52C is projected toward the center 76C of the eye box 76. Therefore, the central display light 52C does not enter either of the eyes 72L, 72R of the user 70 in a normal usage mode shown in FIG. 2A. As a result, a virtual image 50C based on the central display light 52C is not viewed by the user 70.

FIG. 2B schematically shows the light path of a display light for the left eye 52L traveling toward the left region 76L of the eye box 76. The display light for the left eye 52L is, as indicated by an arrow L, a display light output at an angle to the light axis 54 and is output in a direction on the left of the center 14C of the display unit 14. Therefore, the display light for the left eye 52L is reflected at a position 16L displaced leftward from the center 16C of the concave mirror 16 or the neighborhood thereof. As the display light for the left eye 52L enters the left eye 72L of the user 70, a virtual image for the left eye 50L based on the display light for the left eye 52L is viewed by the user 70.

FIG. 2C schematically shows the light path of a display light for the right eye 52R traveling toward the right region 76R of the eye box 76. The display light for the right eye 52R is, as indicated by an arrow R, a display light output at an angle to the light axis 54 and is output from a position on the right of the center 14C of the display unit 14. Therefore, the display light for the right eye 52R is reflected at a position 16R displaced rightward from the center 16C of the concave mirror 16 or the neighborhood thereof. As the display light for the right eye 52R enters the right eye 72R of the user 70, a virtual image for the right eye 50R based on the display light for the right eye 52R is viewed by the user 70.

Distortion caused by the reflection of the display light 52C, 52L, 52R on the concave mirror 16 (e.g., distortion aberration) could be produced in the virtual images 50C, 50L, 50R shown in FIGS. 2A-2C. The amount of distortion produced by the concave mirror 16 could increase as a result of the display light being reflected at a position distanced from the center 16C of the concave mirror 16. Therefore, the distortion of the virtual image for the left eye 50L and the virtual image for the right eye 50R is larger than the distortion of the central virtual image 50C displayed by the central display light 52C.

Further, distortion asymmetrical in the horizontal direction could be produced in the virtual image for the left eye 50L and the virtual image for the right eye 50R. In the case of the virtual image for the left eye 50L shown in FIG. 2B, for example, the display light output from a left end 14L of the display unit 14 is reflected at a position 16LL more distanced leftward from the center 16C of the concave mirror 16 than the display light output from the center 14C of the display unit 14. Therefore, the amount of distortion at the left end of the virtual image for the left eye 50L is large. In the case of the virtual image for the right eye 50R shown in FIG. 2C, on the other hand, the display light output from a right end 14R of the display unit 14 is reflected at a position 16RR more distanced rightward from the center 16C of the concave mirror 16 than the display light output from the center 14C of the display unit 14. Therefore, the amount of distortion at the right end of the virtual image for the right eye 50R is large.

FIGS. 3A-3E schematically show an image for display 140 displayed on the display unit 14 in a comparative example and virtual images 150L, 150C, 150R, 150 presented based on the image for display 140. FIG. 3A shows an example of the image for display 140 displayed on the display unit 14 and shows a grid test pattern in which vertical straight lines and horizontal straight lines are arranged at equal intervals. FIGS. 3A-3D show a virtual image for the left eye 150L, a central virtual image 150C, and a virtual image for the right eye 150R presented when the image for display 140 of FIG. 3A is displayed on the display unit 14. FIG. 3E shows a virtual image 150 viewed by both eyes.

The central virtual image 150C shown in FIG. 3C corresponds to the central virtual image 50C of FIG. 2A based on the central display light 52C. The impact of distortion aberration produced by the concave mirror 16 is hardly seen. The virtual image for the left eye 150L shown in FIG. 3B corresponds to the virtual image for the left eye 50L of FIG. 2B based on the display light for the left eye 52L and is seen to be affected by horizontally asymmetrical distortion aberration. In the virtual image for the left eye 150L, distortion on the left of the virtual image is relatively large. The virtual image for the right eye 150R shown in FIG. 3D corresponds to the virtual image for the right eye 50R of FIG. 2C based on the display light for the right eye 52R and is seen to be affected by distortion aberration produced by the concave mirror 16. Contrary to the case of the virtual image for the left eye 150L, distortion on the right side of the virtual image is relatively large in the virtual image for the right eye 150R. It can therefore be said that distortion aberration opposite in the horizontal direction is produced in the virtual image for the left eye 150L and the virtual image for the right eye 150R.

FIG. 3E schematically shows a virtual image 150 viewed by the user 70 with both eyes when the image for display 140 is displayed on the display unit 14. FIG. 3E shows the virtual image for the left eye 150L shown in FIG. 3B and the virtual image for the right eye 150R shown in FIG. 3D superimposed on one another. As illustrated, distortion aberration that results in the images appearing differently left and right is produced in the virtual image for the left eye 150L and the virtual image for the right eye 150R so that it is difficult to fuse the images and see them as identical images. If the user strains to see the virtual image for the left eye 150L and the virtual image for the right eye 150R like these as identical images, visual fatigue or dizziness may occur, which is not favorable.

Generally, if the difference in the amount of distortion between the image for the left eye and the image for the right eye is 5% more in binocular vision, it is difficult to fuse the images and see them as identical images. Counter measures to suppress distortion aberration includes configuring the reflecting surface of the concave mirror 16 to be a free-form surface such as an aspherical surface or applying a predetermined distortion correction process to the image for display 140. If it is attempted to increase the curvature of the concave mirror 16 to increase the virtual image magnification factor of the concave mirror 16, however, it will be difficult to configure the difference in the amount of distortion between the virtual image for the left eye 150L and the virtual image for the right eye 150R to be less than 5%.

This is addressed by this embodiment by preparing an image for the left eye and an image for the right eye separately as images to be displayed by the display unit 14 and applying different distortion correction processes to the image for the left eye and the image for the right eye. More specifically, the first distortion correction process is applied to the image for the left eye to reduce or cancel the distortion aberration produced in the virtual image for the left eye 150L. Further, the second distortion correction process is applied to the image for the right eye to reduce or cancel the distortion aberration produced in the virtual image for the right eye 150R. The second distortion correction process is a correction process of a mode different from the first distortion correction process and is, for example, a correction process that corrects the image in an amount opposite to that of the first distortion correction process in the horizontal direction.

Figure 4A:
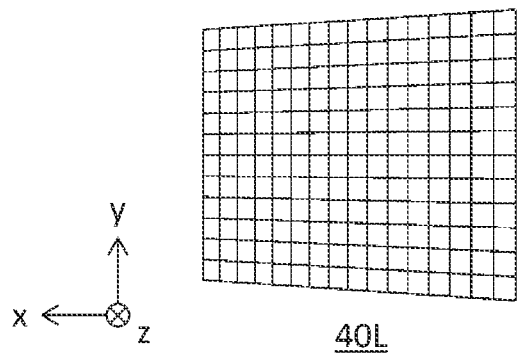
FIGS. 4A-4E schematically show images displayed on the display unit according to this embodiment and the virtual images presented based on the images.
Figure 4B:
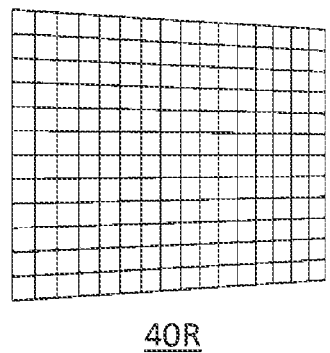

FIGS. 4A-4E schematically show images 40L, 40R displayed on the display unit 14 according to this embodiment and the virtual images 50L, 50R, 50 presented based on the images 40L, 40R. FIG. 4A schematically shows the image for the left eye 40L displayed on the display unit 14, i.e., the image derived from applying the first distortion correction process to the image for display 140 of FIG. 3A. The distortion correction process asymmetrical in the horizontal direction is applied to the image for the left eye 40L so that the amount of correction is maximum at the left end of the image. FIG. 4B schematically shows the image for the right eye 40R displayed on the display unit 14, i.e., the image derived from applying the second distortion correction process to the image for display 140 of FIG. 3A. The distortion correction process asymmetrical in the horizontal direction is applied to the image for the right eye 40R so that the amount of correction is maximum at the right end of the image.

Figure 4C:
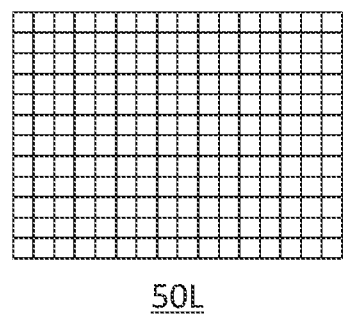
Figure 4D:
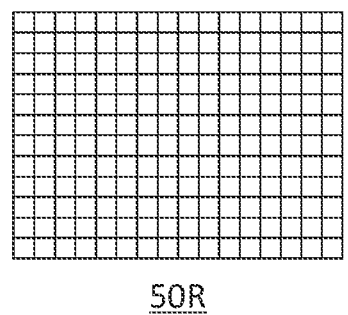

FIG. 4C schematically shows the virtual image for the left eye 50L presented by the display light for the left eye 52L when the image for the left eye 40L is displayed on the display unit 14. As illustrated, the distortion aberration produced in the concave mirror 16 is reduced or canceled by applying the first distortion aberration process to the image for the left eye 40L so that the virtual image for the left eye 50L that looks the same as the image for display 140 shown in FIG. 3A can be presented. FIG. 4D schematically shows the virtual image for the right eye 50R presented by the display light for the right eye 52R when the image for the right eye 40R is displayed on the display unit 14. As illustrated, the distortion aberration produced in the concave mirror 16 is reduced or canceled by applying the second distortion aberration process to the image for the right eye 40R so that the virtual image for the right eye 50R that looks the same as the image for display 140 shown in FIG. 3A can be presented.

Figure 4E:
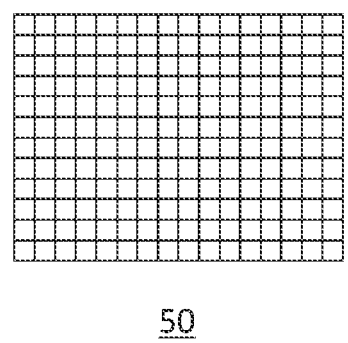

FIG. 4E schematically shows the virtual image 50 viewed by the user 70 with both eyes when the virtual image for the left eye 50L of FIG. 4C and the virtual image for the right eye 50R of FIG. 4D are presented. FIG. 4E shows the virtual image for the left eye 50L shown in FIG. 4C and the virtual image for the right eye 50R shown in FIG. 4D superimposed on one another. As illustrated, the virtual image for the left eye 50L and the virtual image for the right eye 50R look substantially the same so that it is easy to fuse the images and see them as identical images. According to this embodiment, visual fatigue and dizziness can be prevented, and the viewability of the virtual image 50 can be presented by presenting the virtual image 50 as described above.

A description will now be given of the configuration of the optical system of the illumination unit 12 and the display unit 14 for presenting the virtual image 50 as shown in FIG. 4E. Normally, when different images are displayed for the left eye and the right eye, it is necessary to prepare a display unit for the left eye and a display unit for the right eye separately, but provision of a plurality of display units leads to an increase in the cost. In this embodiment, the image for the left eye 40L and the image for the right eye 40R are displayed alternately in the single display unit 14 by dividing time so that the display light for the left eye 52L and the display light for the right eye 52R are produced alternately by dividing time. Further, the display unit 14 is irradiated by the first illumination light for producing the display light for the left eye 52L and the second illumination light for producing the display light for the right eye 52R alternately by dividing time. This causes the display light for the left eye 52L to be projected toward the left region 76L of the eye box 76 and causes the display light for the right eye 52R to be projected toward the right region 76R of the eye box 76.

FIRST EMBODIMENT

Figure 5:
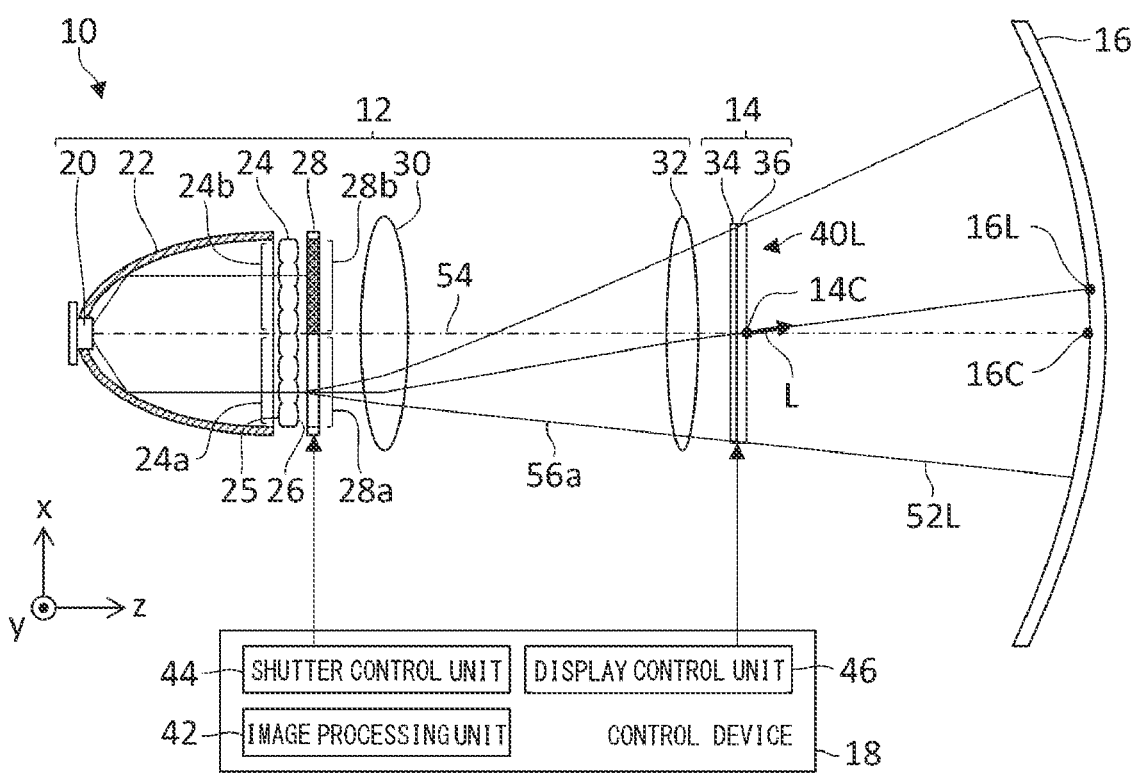
FIG. 5 shows the detail of the configuration of the head-up display device according to the first embodiment.
Figure 6:
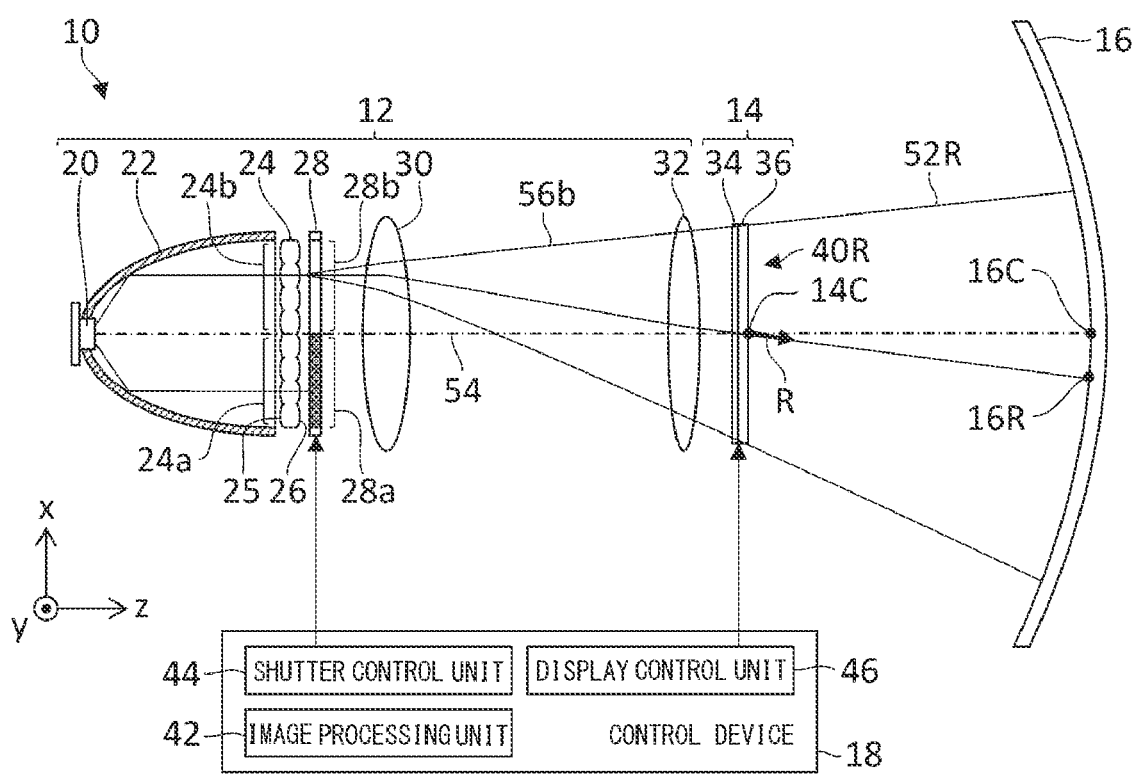
FIG. 6 shows the detail of the configuration of the head-up display device according to the first embodiment.

FIGS. 5 and 6 show the detail of the configuration of the head-up display device 10 according to the embodiment. FIG. 5 corresponds to the configuration of FIG. 2B and shows an operating state in which the image for the left eye 40L is displayed on the display unit 14 to produce the display light for the left eye 52L. FIG. 6 corresponds to the configuration of FIG. 2C and shows an operating state in which the image for the right eye 40R is displayed on the display unit 14 to produce the display light for the right eye 52R.

The illumination unit 12 includes a light source 20, a collimator 22, a fly eye lens 24, a shutter 28, a condenser 30, and a field lens 32. The display unit 14 includes a light diffuser plate 34, and a display element 36. The optical elements, which form the illumination unit 12 and the display unit 14, and the concave mirror 16 are provided on the light axis 54. In the figures, the direction of the light axis 54 is defined as the z direction, and the two directions orthogonal to the z direction are defined as the x direction and the y direction. The x direction is defined by the horizontal direction of the image displayed on the display unit 14, and the y direction is defined by the vertical direction of the image displayed on the display unit 14.

The light source 20 is comprised of a semiconductor light emitting element such as an LED. The light source 20 outputs white light for illuminating the display unit 14. The collimator 22 turns the output light of the light source 20 into a parallel light to produce parallel light beams aligned with the light axis 54. The collimator 22 is comprised of a parabolic mirror or an ellipsoidal mirror, and the light source 20 is provided at the focal position of the collimator 22. The collimator 22 may be comprised of a lens instead of a mirror. For example, the collimator 22 may be a total internal reflection (TIR) lens that utilizes total internal reflection.

The fly eye lens 24 splits the output light of the light source 20 into a plurality of light beams. The fly eye lens 24 has a first lens surface 25 and a second lens surface 26. A plurality of lens elements are arranged in an array in the x direction and in the y direction on each of the first lens surface 25 and the second lens surface 26. Each lens element forming the fly eye lens 24 is rectangular and is configured to be analogous to the rectangular display unit 14. When the aspect ratio of the display unit 14 is 1 to 2, the aspect ratio of each lens element forming the fly eye lens 24 is also 1 to 2.

Each lens element of the first lens surface 25 condenses the parallel light beams entering the first lens surface 25. The focal point of each lens element on the first lens surface 25 is located in the corresponding lens element on the second lens surface 26. In other words, the interval between the first lens surface 25 and the second lens surface 26 in the z direction corresponds to the focal distance of each lens element on the first lens surface 25. As a result, the parallel light beams entering the first lens surface 25 are condensed in the lens elements on the second lens surface 26. Each lens element on the second lens surface 26 can be regarded as a virtual point light source, and a split illumination light beam is output from each lens element on the second lens surface 26.

The shutter 28 shields a portion of a plurality of illumination light beams output from the fly eye lens 24. The shutter 28 selectively shields a first region 24a or a second region 24b of the fly eye lens 24. The first region 24a of the fly eye lens 24 is a region on the right of the light axis 54 in the x direction. Further, the second region 24b of the fly eye lens 24 is a region on the left of the light axis 54 in the x direction.

Figure 7A:
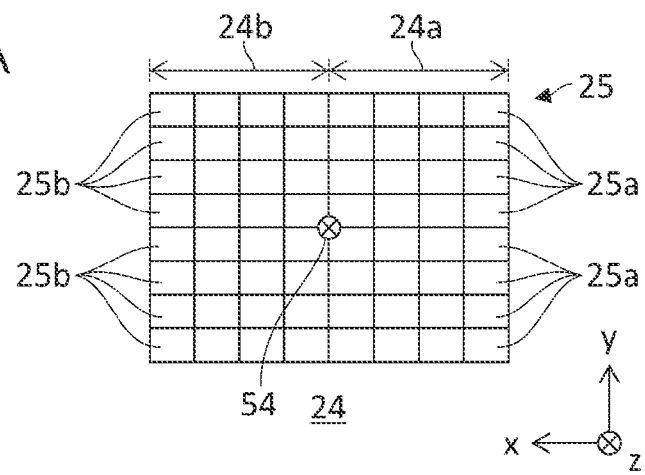
FIGS. 7A-7C are front views schematically showing the configuration of the fly eye lens and the shutter.
Figure 7B:
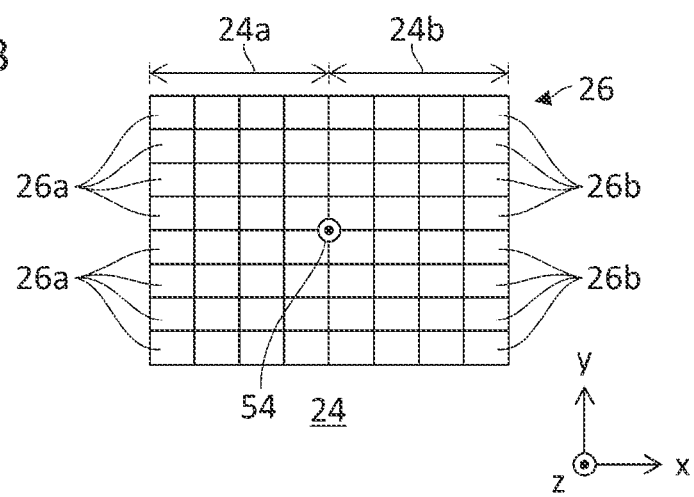
Figure 7C:
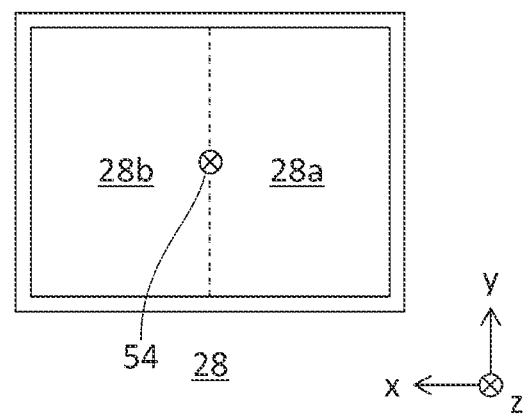

FIGS. 7A-7C are front views schematically showing the configuration of the fly eye lens 24 and the shutter 28. FIG. 7A is a view of the fly eye lens 24 facing the first lens surface 25. As illustrated, a plurality of lens elements 25a, 25b are arranged on the first lens surface 25 in the x direction and in the y direction. A plurality of first lens elements 25a are provided in the first region 24a of the fly eye lens 24, and a plurality of second lens elements 25b are provided in the second region 24b of the fly eye lens 24. The fly eye lens 24 is bilaterally symmetric, and the first lens element 25a and the second lens element 25b have the same shape and optical characteristics.

FIG. 7B is a view of the fly eye lens 24 facing the second lens surface 26. FIG. 7B is a horizontally flipped version of FIG. 7A. The second lens surface 26 is configured in a manner similar to that of the first lens surface 25. A plurality of lens elements 26a, 26b are arranged on the second lens surface 26 in the x direction and in the y direction. A plurality of third lens elements 26a are provided in the first region 24a of the fly eye lens 24, and a plurality of fourth lens elements 26b are provided in the second region 24b of the fly eye lens 24. The third lens element 26a and the fourth lens element 26b have the same shape and optical characteristics.

A plurality of light beams are output from the second lens surface 26. More specifically, a plurality of first illumination light beams are output from the first region 24a on the second lens surface 26, and each third lens element 26a outputs one first illumination light beam. Similarly, a plurality of second illumination light beams are output from the second region 24b on the second lens surface 26, and each fourth lens element 26b outputs one second illumination light beam.

FIG. 7C shows the shutter 28 as seen from the fly eye lens 24. The shutter 28 is comprised of, for example, a liquid crystal shutter having a variable transmittance. The shutter 28 has a first region 28a and a second region 28b. The first region 28a of the shutter 28 is a region overlapping the first region 24a of the fly eye lens 24 in the z direction, and the second region 28b of the shutter 28 is a region overlapping the second region 24b of the fly eye lens 24 in the z direction.

The shutter 28 switches between transmission and shielding of a plurality of first illumination light beams output from the first region 24a by changing the transmittance of the first region 28a. The shutter 28 switches between transmission and shielding of a plurality of second illumination light beams output from the second region 24b by changing the transmittance of the second region 28b overlapping the second region 24b of the fly eye lens 24 in the z direction.

The shutter 28 transmits only the plurality of first illumination light beams and shields the plurality of second illumination light beams by operating in a first state in which the first region 28a is configured to transmit light and the second region 28b is configured to shield light (see FIG. 5). The shutter 28 shields the plurality of first illumination light beams and transmits only the plurality of second illumination light beams by operating in a second state in which the first region 28a is configured to shield light and the second region 28b is configured to transmit light (see FIG. 6).

In the configuration shown in FIGS. 5 and 6, the shutter 28 is provided on the light output side of the fly eye lens 24, i.e., between the fly eye lens 24 and the condenser 30. Alternatively, the shutter 28 may be provided on the light entrance side of the fly eye lens 24 and may be provided between the collimator 22 and the fly eye lens 24, i.e., between the light source 20 and the fly eye lens 24. The fly eye lens 24 is formed such that the first lens surface 25 and the second lens surface 26 are integrated. Alternatively, the first lens surface 25 and the second lens surface 26 may be separate. In other words, the first fly eye lens corresponding to the first lens surface 25 and the second fly eye lens corresponding to the second lens surface 26 may be combined for use in place of the fly eye lens 24. In other words, the shutter 28 may be provided between the first fly eye lens and the second fly eye lens.

The condenser 30 produces the illumination light by superimposing the plurality of illumination light beams output from the fly eye lens 24. The condenser 30 is comprised of a convex lens. The condenser 30 causes the illumination light beams output from the lens elements of the fly eye lens 24 to illuminate the entirety of the display region of the display unit 14. Therefore, the plurality of illumination light beams output from the fly eye lens 24 overlap each other in the display region of the display unit 14.

In this embodiment, the plurality of first illumination light beams output from the first region 24a of the fly eye lens 24 and the plurality of second illumination light beams output from the second region 24b of the fly eye lens 24 selectively enter the condenser 30. The condenser 30 produces a first illumination light 56a by superimposing the plurality of first illumination light beams and causes the display unit 14 to be illuminated by the first illumination light 56a. The first illumination light 56a enters the display unit 14 from the right side of the light axis 54. Further, the condenser 30 produces a second illumination light 56b by superimposing the plurality of second illumination light beams. In contrast with the first illumination light 56a, the second illumination light 56b enters the display unit 14 from the left of the light axis 54.

The field lens 32 is provided to follow the condenser 30 and adjusts the light distribution of the first illumination light 56a and the second illumination light 56b. The field lens 32 adjusts the light distribution of the first illumination light 56a and the second illumination light 56b so that the range in which the reflecting surface of the concave mirror 16 is located and the range in which the display light 52L, 52R enters the concave mirror 16 correspond to each other.

The light diffuser plate 34 is provided on the light entrance side of the display element 36 and is configured to diffuse the first illumination light 56a and the second illumination light 56b entering the display element 36. The light diffuser plate 34 is comprised of, for example, a transmissive screen such as a microbead film. The light diffuser plate 34 functions as a backlight of the display element 36 and functions to make the display element 36 appear as a self-luminous display device.

The display element 36 produces the display light 52 by modulating the illumination light. The display element 36 is a transmissive display element such as a liquid crystal panel and produces the display light 52 corresponding to the display content of the image displayed in the display region by modulating the illumination light entering the pixels of the display region. The display element 36 may be a digital mirror device (DMD) or a reflective display element such as a liquid crystal on silicon (LCOS).

As shown in FIG. 5, the display element 36 produces the display light for the left eye 52L by modulating the first illumination light 56a. The first illumination light 56a enters the display unit 14 from the right side of the light axis 54 so that the display light for the left eye 52L produced based on the first illumination light 56a is output in a direction on the left of the display unit 14 as indicated by the arrow L. The display light for the left eye 52L output from the center 14C of the display unit 14 enters a position 16L displaced to the left from the center 16C of the concave mirror 16.

As shown in FIG. 6, the display element 36 produces the display light for the right eye 52R by modulating the second illumination light 56b. The second illumination light 56b enters the display unit 14 from the left side of the light axis 54 so that the display light for the right eye 52R produced based on the second illumination light 56b is output in a direction on the right of the display unit 14 as indicated by the arrow R. The display light for the right eye 52R output from the center 14C of the display unit 14 enters a position 16R displaced to the right from the center 16C of the concave mirror 16.

The control device 18 includes an image processing unit 42, a shutter control unit 44, and a display control unit 46.

The image processing unit 42 produces an image for display that is displayed on the display unit 14. The image processing unit 42 applies the first distortion correction process to the image for display to produce the image for the left eye 40L and applies the second distortion correction process to the image for display to produce the image for the right eye 40R. The mode of processing in the first distortion correction process and the second distortion correction process is appropriately set in accordance with the distortion of the virtual image for the left eye 50L and the virtual image for the right eye 50R produced in the optical system of the head-up display device 10.

The shutter control unit 44 controls the operation of the shutter 28. The shutter control unit 44 switches the operation of the shutter 28 between the first state and the second state to produce the first illumination light 56a and the second illumination light 56b alternately. The shutter control unit 44 switches the operating state of the shutter 28 at a speed at which the human eyes cannot perceive the switching between the virtual image for the left eye 50L and the virtual image for the right eye 50R. The speed of switching between the first state and the second state is, for example, 60 times (60 Hz) or more per one second. The shutter control unit 44 can be said to be an "illumination control unit" for controlling the operation of the illumination unit 12.

The display control unit 46 controls the operation of the display unit 14. The display control unit 46 generates an image signal for driving the display element 36 and causes the image for the left eye 40L and the image for the right eye 40R to be displayed alternately on the display element 36. The display control unit 46 switches the image to be displayed on the display element 36 in synchronization with the operation of the shutter 28. The display control unit 46 causes the display element 36 to display the image for the left eye 40L when the shutter 28 is operated in the first state to produce the first illumination light 56a. The display control unit 46 causes the display element 36 to display the image for the right eye 40R when the shutter 28 is operated in the second state to produce the second illumination light 56b. This ensures that the display light for the left eye 52L and the display light for the right eye 52R are produced alternately.

Figure 8A:
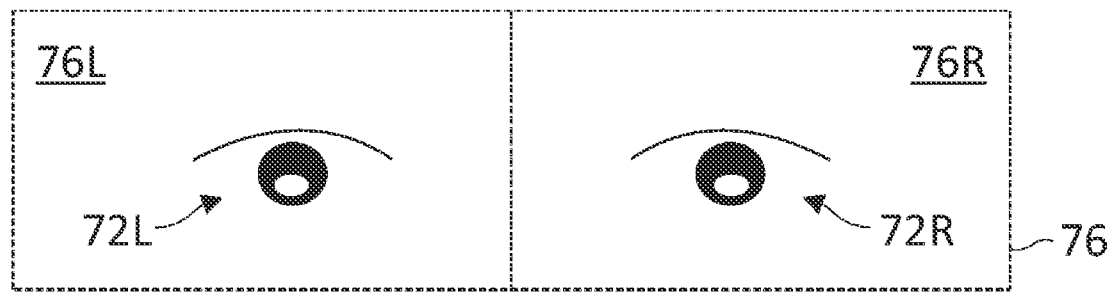
FIGS. 8A-8C show the advantage provided by the head-up display device according to the embodiment.
Figure 8B:
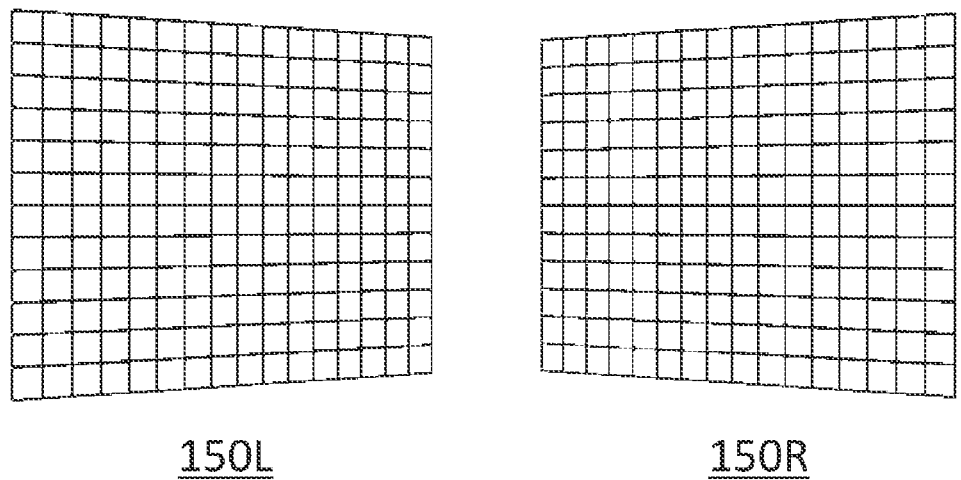
Figure 8C:
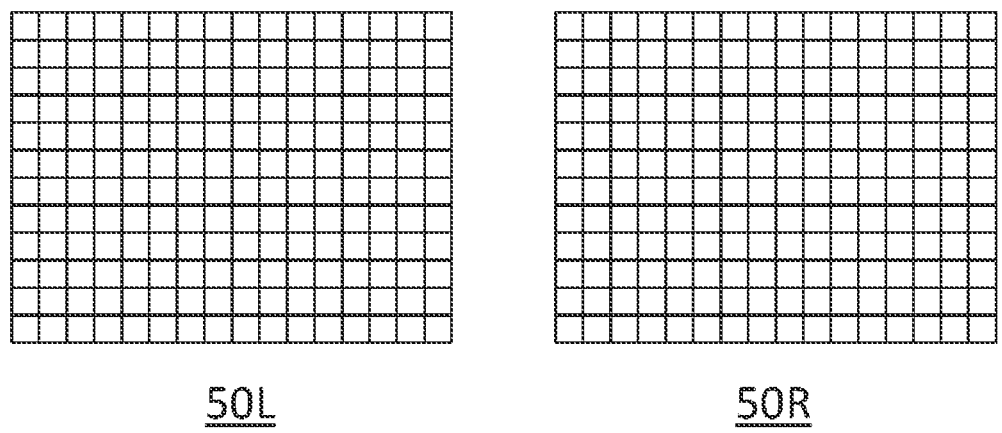

FIGS. 8A-8C show the advantage provided by the head-up display device 10 according to the embodiment. FIG. 8A schematically shows the positions of the eyes 72L, 72R in the eye box 76. The left eye 72L and the right eye 72R are located near the center of the left region 76L and the right region 76R of the eye box 76, respectively. FIG. 8B shows how the virtual images 150L, 150R appear in a comparative example. In the comparative example, the image for display 140 displayed on the display unit 14 is not subjected to a distortion correction process so that the virtual images 150L, 150R that appear differently left and right are presented. FIG. 8C shows how the virtual images 50L, 50R according to the embodiment appear and shows a case in which the images 40L, 40R subjected to different distortion correction processes are displayed on the display unit 14. According to this embodiment, preparing the image for the left eye 40L and the image for the right eye 40R separately reduces the difference in appearance between the virtual image for the left eye 50L and the virtual image for the right eye 50R and makes it easy to fuse the virtual image for the left eye 50L and the virtual image for the right eye 50R. This improves the viewability of the virtual image 50 as viewed by both eyes and suitably prevents visual fatigue or dizziness.

Figure 9A:
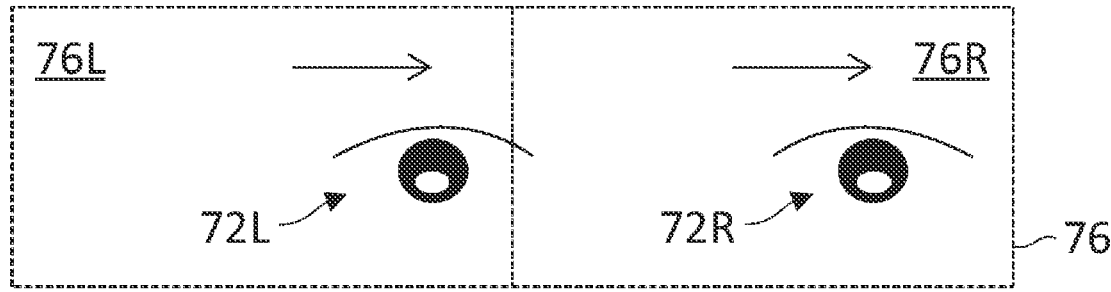
FIGS. 9A-9C show the advantage provided by the head-up display device according to the embodiment.
Figure 9B:
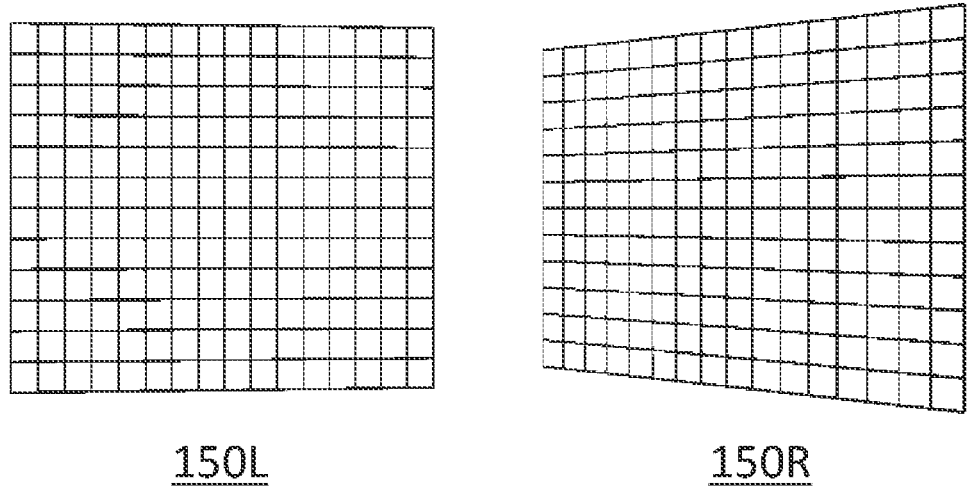
Figure 9C:
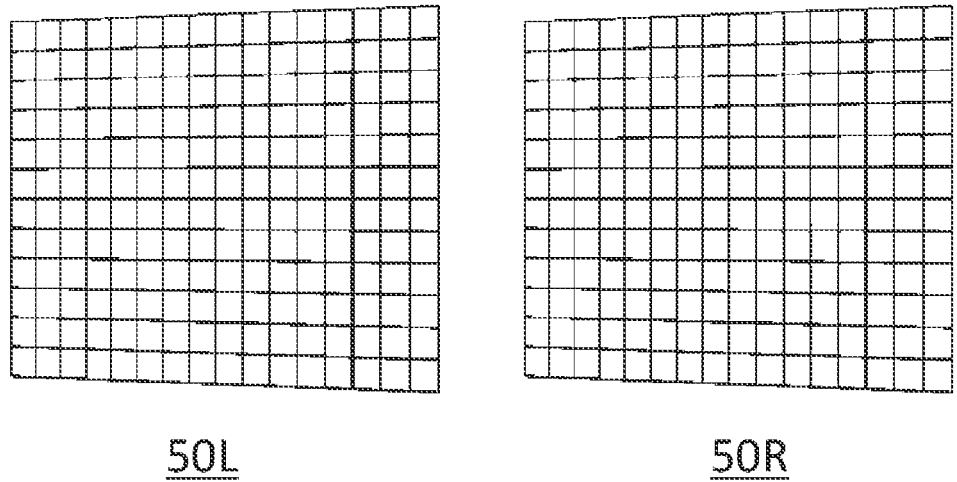

FIGS. 9A-9C show the advantage provided by the head-up display device 10 according to the embodiment and show a case in which the positions of the eyes 72L, 72R in the eye box 76 are different from those of FIGS. 8A-8C. As shown in FIG. 9A, the positions of the eyes 72L, 72R are displaced to the left as compared with those of FIG. 8A. The left eye 72L is displaced to the neighborhood of the center of the eye box 76, and the right eye 72R is displaced to the neighborhood of the right end of the eye box 76.

FIG. 9B shows how the virtual images 150L, 150R according to the related example appear and shows how the virtual images 150L, 150R appear when the image for display 140 displayed on the display unit 14 is not subjected to a distortion correction process. Since the left eye 72L is located near the center of the eye box 76, the virtual image 150L viewed by the left eye is affected little by distortion aberration. This is similar to the appearance of the central virtual image 50C based on the central display light 52C shown in FIG. 2A. Meanwhile, the right eye 72R is located near the right end of the eye box 76 so that the amount of distortion is larger than that of the virtual image for the right eye 150R shown in FIG. 8B. Therefore, the difference in appearance between the virtual image for the left eye 150L and the virtual image for the right eye 150R is large, and it is difficult to identify the images in a fused image.

FIG. 9C shows how the virtual images 50L, 50R according to the embodiment appear and shows a case in which the images 40L, 40R subjected to different distortion correction processes are displayed on the display unit 14. Since the left eye 72L is located near the center of the eye box 76, the amount of correction of the virtual image for the left eye 50L in the first distortion correction process is excessive. Meanwhile, the right eye 72R is located near the right end of the eye box 76 so that the amount of correction of the virtual image for the right eye 50R in the second distortion correction process is insufficient. Consequently, distortion remains in the virtual image for the left eye 50L and the virtual image for the right eye 50R shown in FIG. 9C, but the images will be equally distorted in the horizontal direction. Therefore, this embodiment reduces, even if the positions of the eyes 72L, 72R in the eye box 76 are displaced in the horizontal direction, the difference in appearance between the virtual image for the left eye 50L and the virtual image for the right eye 50R and makes it easy to fuse the virtual image 50L for the left eye and the virtual image for the right eye 50R. This improves the viewability of the virtual image 50 as viewed by both eyes and suitably prevents visual fatigue or dizziness.

When the positions of the eyes 72L, 72R in the horizontal direction relative to the eye box 76 are further displaced until only one of the left eye 72L and the right eye 72R is located in the eye box 76, the virtual image is viewed only with one eye so that difficulty of fusing images with both eyes does not occur.

SECOND EMBODIMENT

Figure 10:
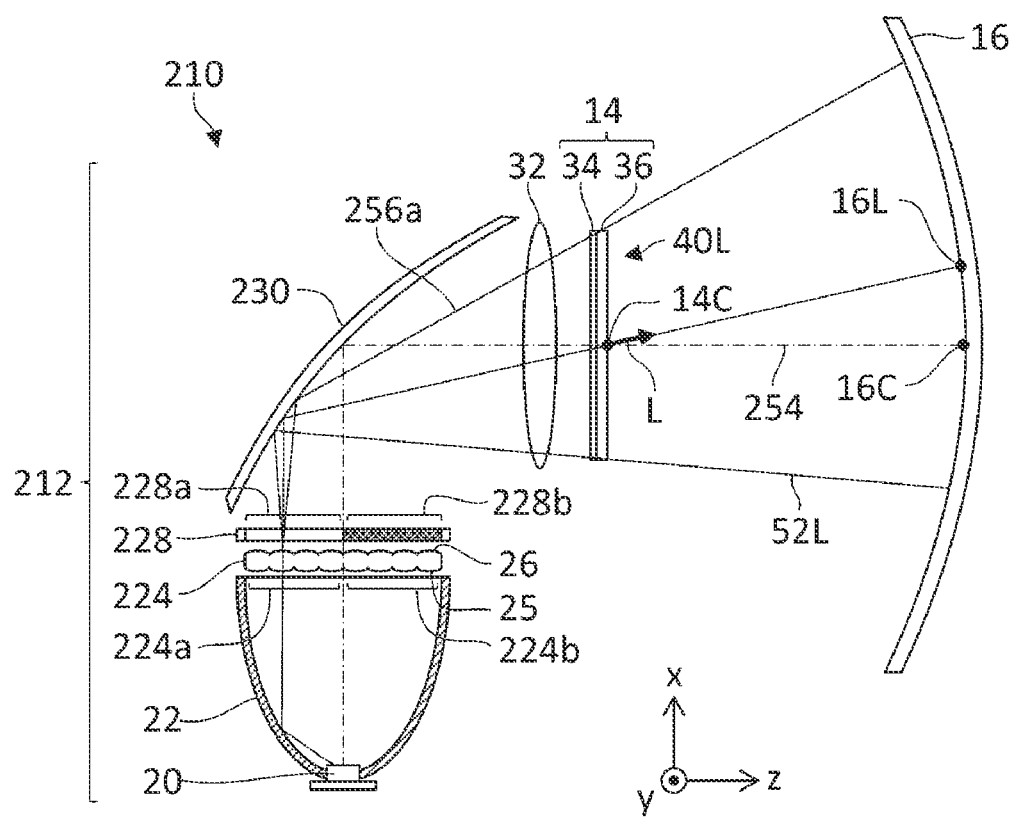
FIG. 10 shows the configuration of a head-up display device according to the second embodiment in detail.

FIG. 10 shows the configuration of a head-up display device 210 according to another embodiment in detail. The head-up display device 210 differs from the foregoing embodiment in that a condenser 230 comprised of a concave mirror is provided in place of the condenser 30 comprised of a convex lens. The head-up display device 210 will be described, highlighting the difference from the foregoing embodiment.

The head-up display device 210 includes an illumination unit 212, a display unit 14, a concave mirror 16, and a control device 18. The display unit 14, the concave mirror 16, and the control device 18 are configured in a manner similar to that of the foregoing embodiment. The illumination unit 212 includes a light source 20, a collimator 22, a fly eye lens 224, a shutter 228, a condenser 230, and a field lens 32. The light source 20, the collimator 22, and the field lens 32 are as described in the foregoing embodiment.

The fly eye lens 224 is configured in a manner similar to that of the fly eye lens 24 according to the foregoing embodiment and has a first lens surface 25 and a second lens surface 26. The horizontal direction of a first region 224a and a second region 224b of the fly eye lens 224 is opposite to that of the foregoing embodiment. More specifically, the first region 224a is provided on the left of a light axis 254, and the second region 224b is provided on the right of the light axis 254. This is because the condenser 230 comprised of a concave mirror returns the illumination light beams by 90° so that the horizontal direction is inverted.

The shutter 228 is configured in a manner similar to that of the shutter 28 according to the foregoing embodiment, but the horizontal direction of the first region 224a and the second region 224b is opposite to that of the foregoing embodiment. More specifically, the first region 228a is provided on the left of the light axis 254, and the second region 228b is provided on the right of the light axis 254.

The condenser 230 produces the illumination light by superimposing the plurality of illumination light beams output from the fly eye lens 224. The condenser 230 superimposes a plurality of first illumination light beams output from the first region 224a of the fly eye lens 224 to produce a first illumination light 256a. The condenser 230 superimposes a plurality of second illumination light beams output from the second region 224b of the fly eye lens 224 to produce a second illumination light (not shown).

The same advantage as that of the foregoing embodiment is also achieved in this embodiment. In further accordance with this embodiment, using a concave mirror as the condenser 230 reduces the width of the illumination unit 212 in the z direction and realizes a more compact head-up display device 210.

THIRD EMBODIMENT

Figure 11:
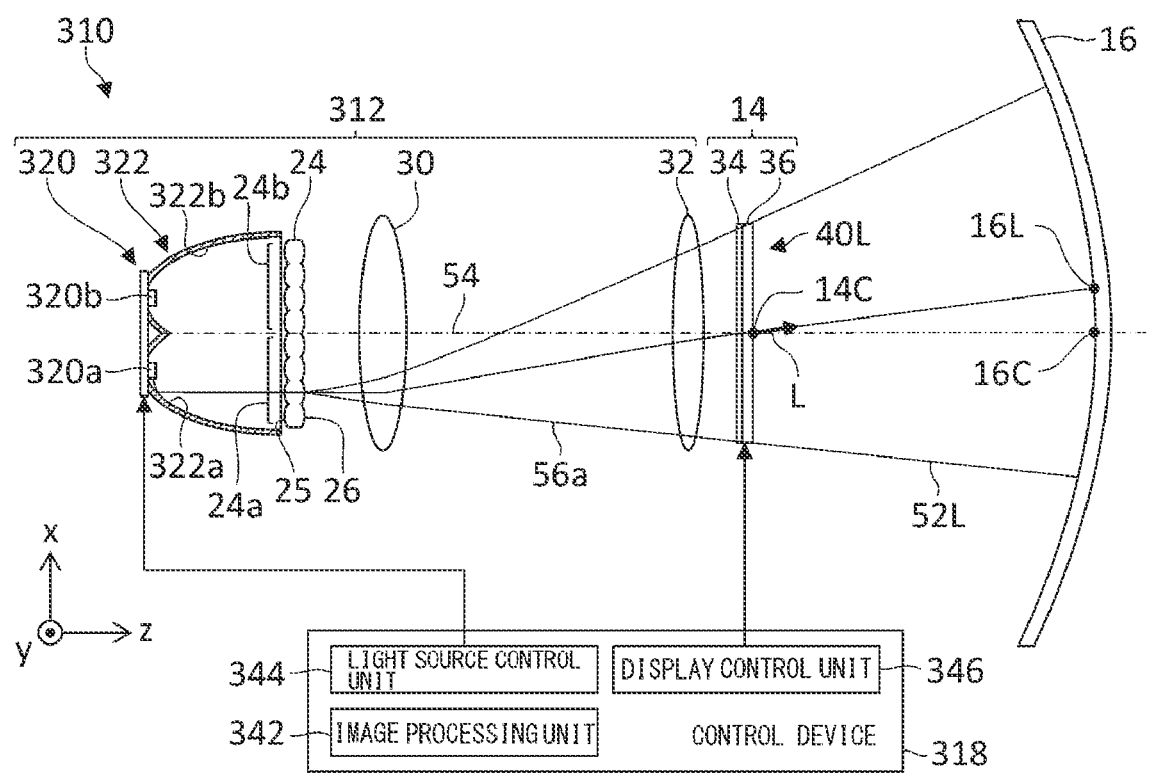
FIG. 11 shows the configuration of a head-up display device according to the third embodiment in detail.
Figure 12:
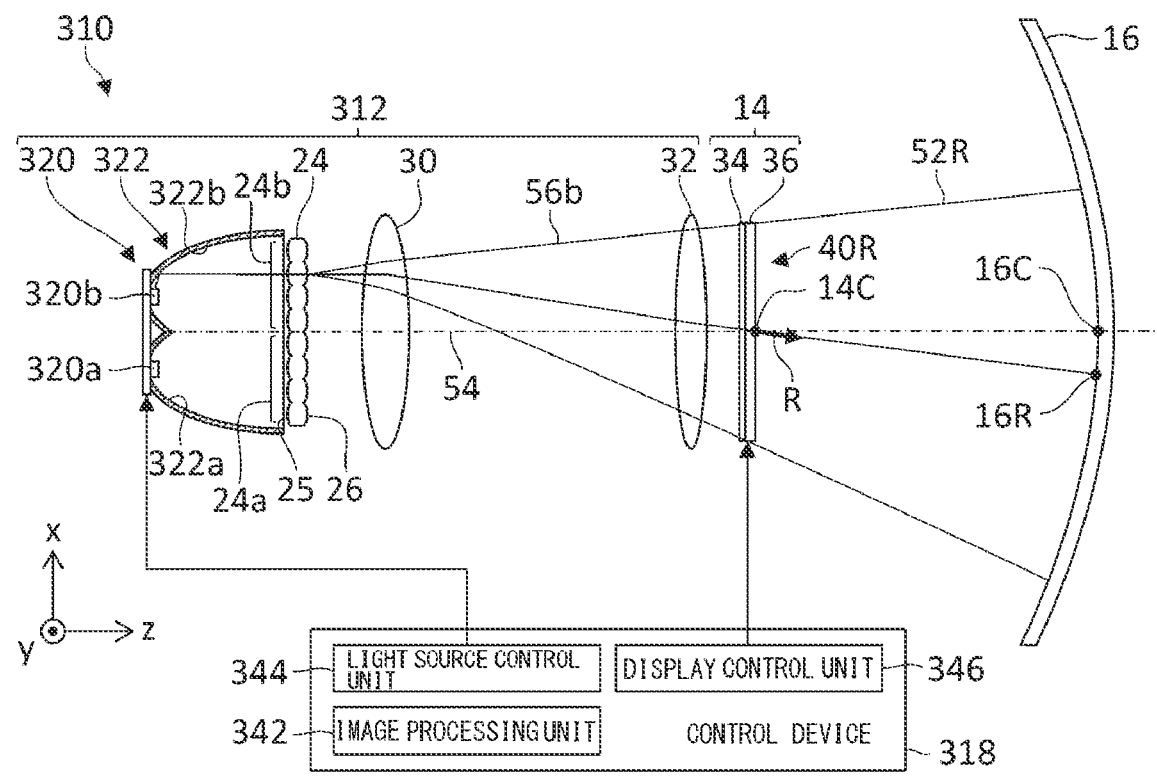
FIG. 12 shows the configuration of a head-up display device according to the third embodiment in detail.

FIGS. 11 and 12 show the configuration of a head-up display device 310 according to the third embodiment in detail. FIG. 11 corresponds to the configuration of FIG. 2B and shows an operating state in which the image for the left eye 40L is displayed on the display unit 14 to produce the display light for the left eye 52L. FIG. 12 corresponds to the configuration of FIG. 2C and shows an operating state in which the image for the right eye 40R is displayed on the display unit 14 to produce the display light for the right eye 52R. This embodiment will be described, highlighting the difference from the foregoing embodiments.

The head-up display device 310 includes an illumination unit 312, a display unit 14, a concave mirror 16, and a control device 318. The display unit 14 and the concave mirror 16 are configured in a manner similar to that of the foregoing embodiments.

The illumination unit 312 includes a light source 320, a collimator 322, a fly eye lens 24, a condenser 30, and a field lens 32. The fly eye lens 24, the condenser 30, and the field lens 32 are configured in a manner similar to that of the foregoing embodiments.

The light source 320 outputs white light for illuminating the display unit 14. The light source 320 includes a first light source 320a and a second light source 320b. The first light source 320a and the second light source 320b are each comprised of a semiconductor light emitting element such as an LED. The first light source 320a is provided on the right of the light axis 54 and is arranged to output light toward the first region 24a of the fly eye lens 24. The second light source 320b is provided on the left of the light axis 54 and is arranged to output light toward the second region 24b of the fly eye lens 24.

The collimator 322 turns the output light of the light source 320 into a parallel light to produce parallel light beams aligned with the light axis 54. The collimator 322 includes a first reflecting surface 322a and a second reflecting surface 322b. The first reflecting surface 322a and the second reflecting surface 322b are each comprised of a parabolic surface or an ellipsoidal surface. The first light source 320a is provided at the focal position of the first reflecting surface 322a, and the second light source 320b is provided at the focal position of the second reflecting surface 322b. The first reflecting surface 322a turns the light output from the first light source 320a into a parallel light and causes the parallel light to enter the first region 24a of the fly eye lens 24. The second reflecting surface 322b turns the light output from the second light source 320b into a parallel light and causes the parallel light to enter the second region 24b of the fly eye lens 24. The collimator 322 may be comprised of a lens instead of a mirror. For example, the collimator 322 may be a total internal reflection (TIR) lens that utilizes total internal reflection.

Figure 13A:
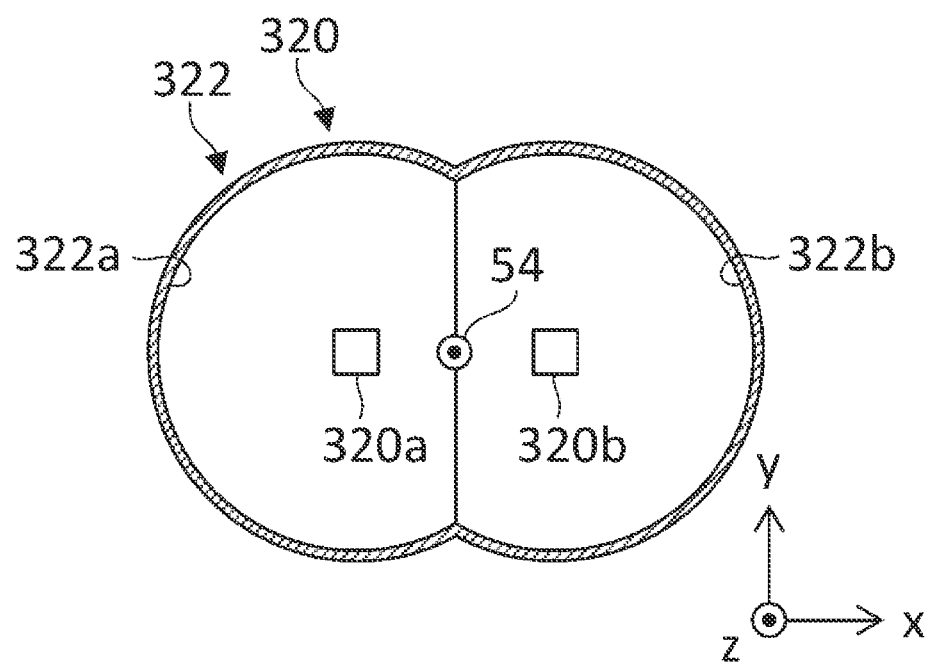
FIGS. 13A-13C are front views schematically showing the configuration of the light source and the collimator and the configuration of the fly eye lens.
Figure 13B:
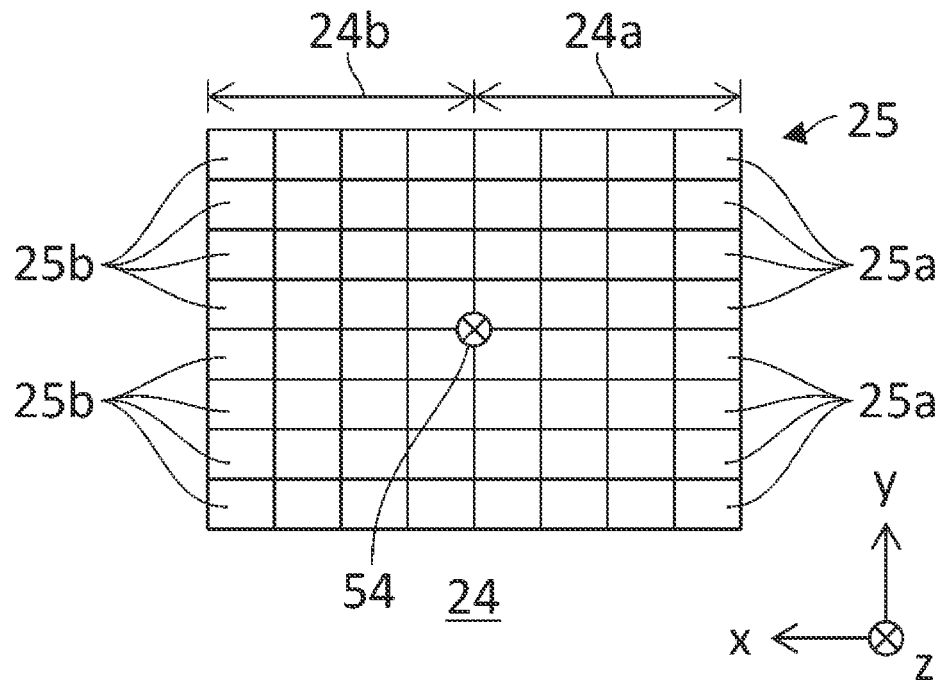
Figure 13C:
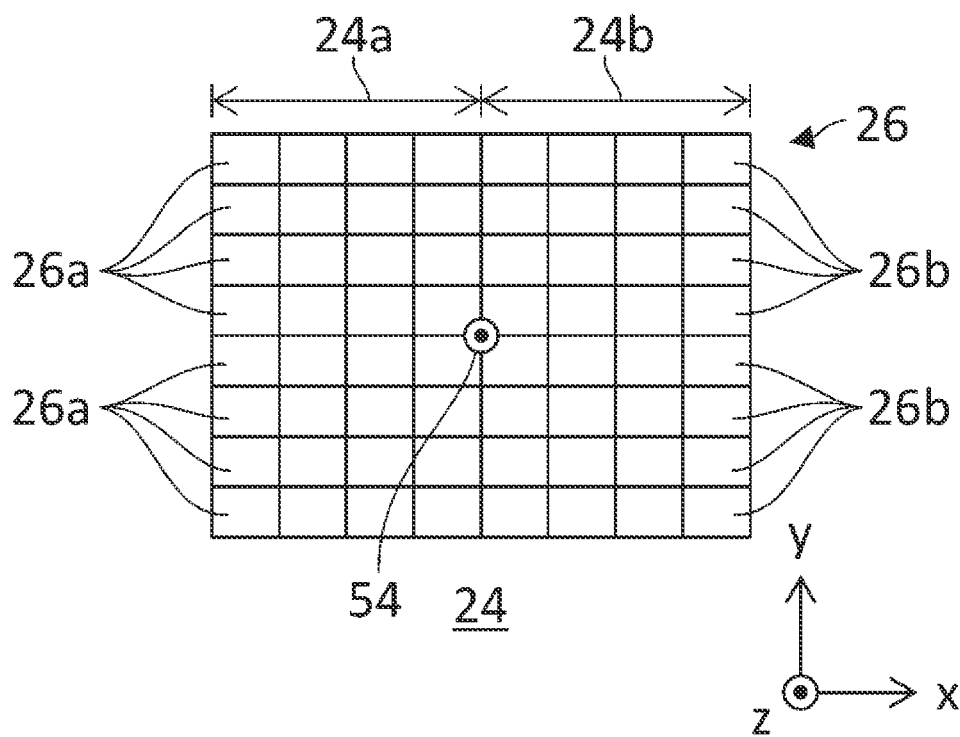

FIGS. 13A-13C are front views schematically showing the configuration of the light source 320 and the collimator 322 and the configuration of the fly eye lens 24. FIG. 13A shows the light source 320 and the collimator 322 as seen from the fly eye lens 24. The first light source 320a and the second light source 320b are provided on the left and right of the light axis 54, respectively. The first reflecting surface 322a and the second reflecting surface 322b each have a shape derived from connecting two parabolic surfaces or ellipsoidal surfaces with a displacement in a horizontal direction. The part connecting the first reflecting surface 322a and the second reflecting surface 322b, i.e., the part between the first light source 320a and the second light source 320b, is not provided with a reflecting surface.

FIG. 13B is a view of the fly eye lens 24 facing the first lens surface 25. FIG. 13B is a horizontally flipped version of FIG. 13A. As illustrated, a plurality of lens elements 25a, 25b are arranged on the first lens surface 25 in the x direction and in the y direction. A plurality of first lens elements 25a are provided in the first region 24a of the fly eye lens 24, and a plurality of second lens elements 25b are provided in the second region 24b of the fly eye lens 24. The fly eye lens 24 is bilaterally symmetric, and the first lens element 25a and the second lens element 25b have the same shape and optical characteristics.

FIG. 13C is a view of the fly eye lens 24 facing the second lens surface 26. FIG. 13C is a horizontally flipped version of FIG. 13B. The second lens surface 26 is configured in a manner similar to that of the first lens surface 25. A plurality of lens elements 26a, 26b are arranged on the second lens surface 26 in the x direction and in the y direction. A plurality of third lens elements 26a are provided in the first region 24a of the fly eye lens 24, and a plurality of fourth lens elements 26b are provided in the second region 24b of the fly eye lens 24. The third lens element 26a and the fourth lens element 26b have the same shape or optical characteristics.

The fly eye lens 24 splits the output light of the light source 320 into a plurality of light beams. The plurality of light beams are output from the second lens surface 26. More specifically, a plurality of first illumination light beams are output from the first region 24a on the second lens surface 26, and each third lens element 26a outputs one first illumination light beam. Similarly, a plurality of second illumination light beams are output from the second region 24b on the second lens surface 26, and each fourth lens element 26b outputs one second illumination light beam.

The light source 320 produces one of the plurality of first illumination light beams and the plurality of second illumination light beams by lighting only one of the first light source 320a and the second light source 320b. By lighting only the first light source 320a and not lighting the second light source 320b, the light source 320 causes the plurality of first illumination light beams to be output from the first region 24a of the fly eye lens 24 (see FIG. 11). By not lighting the first light source 320a and lighting only the second light source 320b, the light source 320 causes the plurality of second illumination light beams to be output from the second region 24b of the fly eye lens 24 (see FIG. 12).

The control device 318 includes an image processing unit 342, a light source control unit 344, and a display control unit 346. The image processing unit 342 is configured in a manner similar to that of the image processing unit 42 according to the foregoing embodiments.

The light source control unit 344 controls the operation of the light source 320. The light source 320 turns on the first light source 320a and the second light source 320b alternately to produce the first illumination light 56a and the second illumination light 56b alternately. The light source control unit 344 switches the first light source 320a and the second light source 320b to be in a lighted state or a non-lighted state at a speed at which the human eyes cannot perceive the switching between the virtual image for the left eye 50L and the virtual image for the right eye 50R. The speed of switching between the lighted state and the non-lighted state is, for example, 60 times (60 Hz) or more per one second. The light source control unit 344 can be said to be an "illumination control unit" for controlling the operation of the illumination unit 312.

The display control unit 346 controls the operation of the display unit 14. The display control unit 346 generates an image signal for driving the display element 36 and causes the image for the left eye 40L and the image for the right eye 40R to be displayed alternately on the display element 36. The display control unit 346 switches the image to be displayed on the display element 36 in synchronization with the operation of the light source 320. The display control unit 346 causes the display element 36 to display the image for the left eye 40L when the first light source 20a is lighted to produce the first illumination light 56a. The display control unit 46 causes the display element 36 to display the image for the right eye 40R when the second light source 20b is lighted to produce the second illumination light 56b. This ensures that the display light for the left eye 52L and the display light for the right eye 52R are produced alternately.

The same advantage as that of the foregoing embodiment as shown in FIGS. 8A-8C and FIGS. 9A-9C is also achieved in this embodiment.

FOURTH EMBODIMENT

Figure 14:
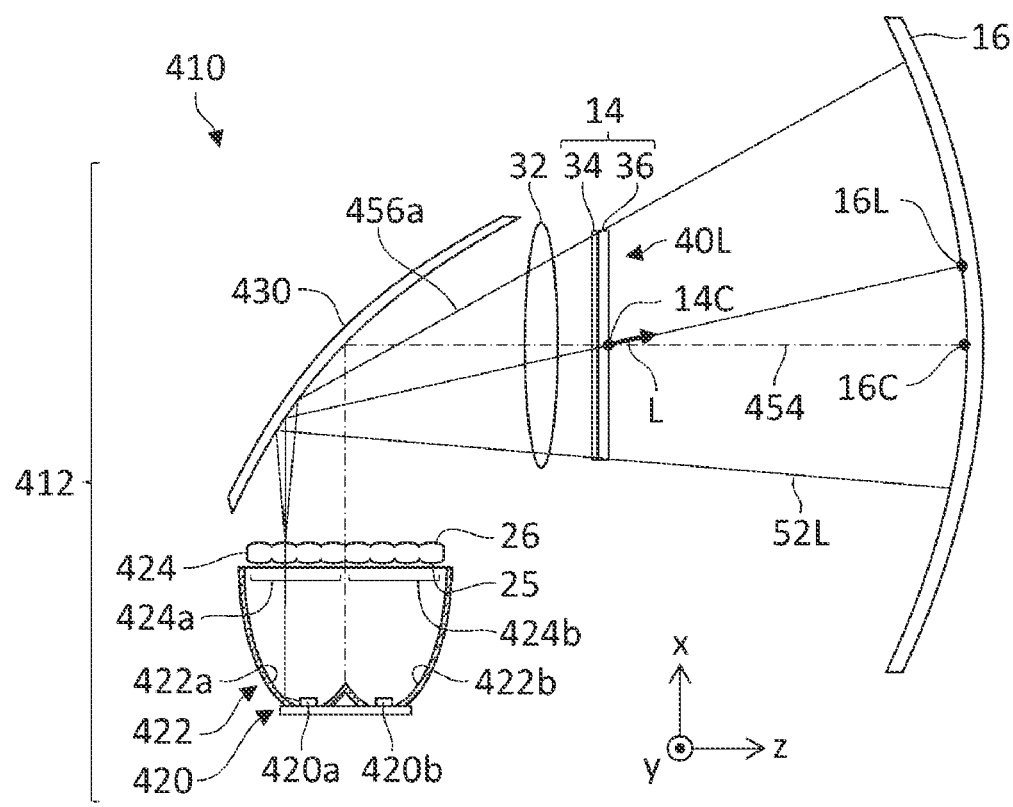
FIG. 14 shows the configuration of a head-up display device according to the fourth embodiment in detail.

FIG. 14 shows the configuration of a head-up display device 410 according to the fourth embodiment in detail. The head-up display device 410 differs from the foregoing embodiments in that a condenser 430 comprised of a concave mirror is provided in place of the condenser 30 comprised of a convex lens. The head-up display device 410 will be described, highlighting the difference from the foregoing embodiments.

The head-up display device 410 includes an illumination unit 412, a display unit 14, a concave mirror 16, and a control device 318. The display unit 14, the concave mirror 16, and the control device 318 are configured in a manner similar to that of the foregoing embodiments. The illumination unit 412 includes a light source 420, a collimator 422, a fly eye lens 424, a condenser 430, and a field lens 32.

The light source 420 is configured in a manner similar to that of the light source 320 according to the foregoing embodiment and includes a first light source 420a and a second light source 420b. The arrangement of the first light source 420a and the second light source 420b of the light source 420 in the horizontal direction is opposite to that of the aforementioned embodiment. More specifically, the first light source 420a is provided on the left of a light axis 454, and the second light source 420b is provided on the right of the light axis 454. This is because the condenser 430 comprised of a concave mirror returns the illumination light beams by 90° so that the horizontal direction is inverted.

The collimator 422 is configured in a manner similar to that of the collimator 322 according to the foregoing embodiment and includes a first reflecting surface 422a and a second reflecting surface 422b. As in the light source 420, the arrangement of the first reflecting surface 422a and the second reflecting surface 422b in the horizontal direction is opposite to that of the foregoing embodiment. More specifically, the first reflecting surface 422a is provided on the left of the light axis 454, and the second reflecting surface 422b is provided on the right of the light axis 454.

The fly eye lens 424 is configured in a manner similar to that of the fly eye lenses 24, 324 according to the foregoing embodiments and includes a first lens surface 25 and a second lens surface 26. The arrangement of a first region 424a and a second region 424b of the fly eye lens 424 in the horizontal direction is opposite to that of the foregoing embodiment. More specifically, the first region 424a is provided on the left of the light axis 254, and the second region 424b is provided on the right of the light axis 454.

The condenser 430 produces an illumination light by superimposing a plurality of illumination light beams output from the fly eye lens 424. The condenser 430 superimposes a plurality of first illumination light beams output from the first region 424a of the fly eye lens 424 to produce a first illumination light 456a. The condenser 430 superimposes a plurality of second illumination light beams output from the second region 424b of the fly eye lens 424 to produce a second illumination light (not shown).

The same advantage as that of the foregoing embodiments is also achieved in this embodiment. In further accordance with this embodiment, using a concave mirror as the condenser 430 reduces the width of the illumination unit 412 in the z direction and realizes a more compact head-up display device 410.

The present invention has been described above with reference to the embodiment but is not limited to the embodiment. Appropriate combinations or replacements of the features of the illustrated examples are also encompassed by the present invention.

Embodiments are summarized below.
(Item 1)
A head-up display device including: a light source;
a fly eye lens that splits an output light of the light source into a plurality of first illumination light beams;

a shutter that selectively shields a first region or a second region of the fly eye lens;

a condenser that produces a first illumination light by superimposing a plurality of first illumination light beams output from the first region of the fly eye lens and produces a second illumination light by superimposing a plurality of second illumination light beams output from the second region of the fly eye lens;

a display unit that produces a display light for the left eye by modulating the first illumination light and produces a display light for the right eye by modulating the second illumination light;

a concave mirror that projects the display light for the left eye and the display light for the right eye toward a virtual image presentation plate to cause the display light for the left eye reflected by the virtual image presentation plate to travel toward a left region of an eye box and to cause the display light for the right eye to travel toward a right region of the eye box;

an image processing unit that produces an image for the left eye by applying a first distortion correction process to an image for display and produces an image for the right eye by applying a second distortion correction process different from the first distortion correction process to the image for display;

a shutter control unit that causes controls the shutter to operate to produce the first illumination light and the second illumination light alternately; and a display control unit that causes the display unit to display the image for the left eye when the first illumination light is produced and causes the display unit to display the image for the right eye when the second illumination light is produced.

(Item 2)

The head-up display device according to item 1, wherein the shutter is provided between the fly eye lens and the condenser.

(Item 3)

A head-up display device including: a light source that includes a first light source and a second light source;

a fly eye lens that includes a first region that splits an output light of the first light source into a plurality of first illumination light beams and a second region that splits an output light of the second light source into a plurality of second illumination light beams;

a condenser that produces a first illumination light by superimposing the plurality of first illumination light beams output from the first region of the fly eye lens and produces a second illumination light by superimposing the plurality of second illumination light beams output from the second region of the fly eye lens;

a display unit that produces a display light for the left eye by modulating the first illumination light and produces a display light for the right eye by modulating the second illumination light;

a concave mirror that projects the display light for the left eye and the display light for the right eye toward a virtual image presentation plate to cause the display light for the left eye reflected by the virtual image presentation plate to travel toward a left region of an eye box and to cause the display light for the right eye to travel toward a right region of the eye box;

an image processing unit that produces an image for the left eye by applying a first distortion correction process to an image for display and produces an image for the right eye by applying a second distortion correction process different from the first distortion correction process to the image for display;

a light source control unit that turns on the first light source and the second light source alternately to produce the first illumination light and the second illumination light alternately; and a display control unit that causes the display unit to display the image for the left eye when the first illumination light is produced and causes the display unit to display the image for the right eye when the second illumination light is produced.

(Item 4)

The head-up display device according to any one of items 1 through 3, wherein the image processing unit applies the first distortion correction to reduce horizontally asymmetrical distortion aberration caused by the display light for the left eye being reflected at a position displaced to the left from a center of the concave mirror and applies the second distortion correction process to reduce horizontally asymmetrical distortion aberration caused by the display light for the right eye being reflected at a position displaced to the right from the center of the concave mirror.

(Item 5)

The head-up display device according to any one of items 1 through 4, wherein the condenser is a convex lens.

(Item 6)

The head-up display device according to any one of items 1 through 4, wherein the condenser is a concave mirror.

It should be understood that the invention is not limited to the above-described embodiment but may be modified into various forms on the basis of the spirit of the invention. Additionally, the modifications are included in the scope of the invention.

What is claimed is:

1. A head-up display device comprising:
    an illumination unit that includes a light source, a fly eye lens, and a condenser, the fly eye lens including a first region that splits an output light of the light source into a plurality of first illumination light beams and a second region that splits the output light of the light source into a plurality of second illumination light beams, the condenser producing a first illumination light by superimposing the plurality of first illumination light beams output from the first region of the fly eye lens and producing a second illumination light by superimposing the plurality of second illumination light beams output from the second region of the fly eye lens;
    a display unit that produces a display light for the left eye by modulating the first illumination light and produces a display light for the right eye by modulating the second illumination light;
    a concave mirror that projects the display light for the left eye and the display light for the right eye toward a virtual image presentation plate to cause the display light for the left eye reflected by the virtual image presentation plate to travel toward a left region of an eye box and to cause the display light for the right eye to travel toward a right region of the eye box;
    an image processing unit that produces an image for the left eye by applying a first distortion correction process to an image for display and produces an image for the right eye by applying a second distortion correction process different from the first distortion correction process to the image for display;

an illumination control unit that causes the illumination unit to generate the first illumination light and the second illumination light alternately; and a display control unit that causes the display unit to display the image for the left eye when the first illumination light is produced and causes the display unit to display the image for the right eye when the second illumination light is produced.

2. The head-up display device according to claim 1, wherein the light source includes a first light source and a second light source, the first region of the fly eye lens splits an output light of the first light source into a plurality of first illumination light beams, and the second region of the fly eye lens splits an output light of the second light source into a plurality of second illumination light beams, and the illumination control unit turns on the first light source and the second light source alternately to produce the first illumination light and the second illumination light alternately.

3. The head-up display device according to claim 1, wherein the illumination unit further includes a shutter that selectively shields the first region or the second region of the fly eye lens, and the illumination control unit causes the shutter to operate to produce the first illumination light and the second illumination light alternately.

4. The head-up display device according to claim 3, wherein the shutter is provided between the fly eye lens and the condenser.

5. The head-up display device according to claim 1, wherein the image processing unit applies the first distortion correction to reduce horizontally asymmetrical distortion aberration caused by the display light for the left eye being reflected at a position displaced to the left from a center of the concave mirror and applies the second distortion correction process to reduce horizontally asymmetrical distortion aberration caused by the display light for the right eye being reflected at a position displaced to the right from the center of the concave mirror.

6. The head-up display device according to claim 1, wherein the condenser is a convex lens.

7. The head-up display device according to claim 1, wherein the condenser is a concave mirror.

* * * * *